US012810187B2

(12) United States Patent
Chen et al.

(10) Patent No.: US 12,810,187 B2
(45) Date of Patent: Nov. 24, 2026

(54) ZERO-ADDED-LOSS ENTANGLED PHOTON MULTIPLEXING SOURCE

(71) Applicant: Massachusetts Institute of Technology, Cambridge, MA (US)

(72) Inventors: Kevin Chen, Cambridge, MA (US); Prajit Dhara, Tucson, AZ (US); Saikat Guha, Tucson, AZ (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 947 days.

(21) Appl. No.: 18/172,431

(22) Filed: Feb. 22, 2023

(65) Prior Publication Data

US 2023/0342650 A1 Oct. 26, 2023

Related U.S. Application Data

(60) Provisional application No. 63/333,838, filed on Apr. 22, 2022.

(51) Int. Cl.
*G06N 10/40* (2022.01)
*H04B 10/70* (2013.01)

(52) U.S. Cl.
CPC ............ *G06N 10/40* (2022.01); *H04B 10/70* (2013.01)

(58) Field of Classification Search
USPC ........................................................ 716/100
See application file for complete search history.

(56) References Cited

U.S. PATENT DOCUMENTS

| | | | | |
|---|---|---|---|---|
| 12,014,246 | B2 * | 6/2024 | Bhaskar | G02B 6/1225 |
| 12,554,175 | B1 * | 2/2026 | Rudolph | G02F 1/3501 |
| 2020/0150511 | A1 * | 5/2020 | Carolan | G02F 1/3551 |

(Continued)

OTHER PUBLICATIONS

Askarani et al. "Long-lived solid-state optical memory for high-rate quantum repeaters." Physical Review Letters 127.22 (2021): 220502, 8 pages.

(Continued)

*Primary Examiner* — Brian Ngo
(74) *Attorney, Agent, or Firm* — Smith Baluch LLP

(57) ABSTRACT

We disclose optical entanglement distribution in quantum networks based on a quasi-deterministic entangled photon pair source. Combining heralded photonic Bell pair generation with spectral mode conversion to interface with quantum memories eliminates switching losses due to multiplexing in the source. This zero-added-loss multiplexing (ZALM) Bell pair source is especially useful for the particularly challenging problem of long-baseline entanglement distribution via satellites and ground-based memories, where it unlocks additional advantages: (i) the substantially higher channel efficiency $\eta$ of downlinks versus uplinks with realistic adaptive optics, and (ii) photon loss occurring before interaction with the quantum memory—i.e., Alice and Bob receiving rather than transmitting—improve entanglement generation rate scaling by $\mathcal{O}(\sqrt{\eta})$. Numerical analyses suggest that this protocol can achieve >10 ebit/s at memory multiplexing of $10^2$ spin qubits for ground distance $>10^2$ km, with the spin-spin Bell state fidelity exceeding 99%.

23 Claims, 4 Drawing Sheets

(56) References Cited

U.S. PATENT DOCUMENTS

2021/0176055 A1* 6/2021 Rahman ................ H04L 9/0855
2026/0058732 A1* 2/2026 Ellis ....................... H04B 10/70

OTHER PUBLICATIONS

Azuma et al. "All-photonic quantum repeaters." Nature Communications 6.1 (2015): 6787, 7 pages.
Barrett et al. "Efficient high-fidelity quantum computation using matter qubits and linear optics." Physical Review A 71.6 (2005): 060310, 4 pages.
Barz et al. "Heralded generation of entangled photon pairs." Nature Photonics 4.8 (2010): 553-556.
Bhaskar et al. "Experimental demonstration of memory-enhanced quantum communication." Nature 580.7801 (2020): 60-64, 17 pages.
Bouwmeester et al. "Experimental quantum teleportation." Nature 390.6660 (1997): 575-579.
Bozovich "Nepp Space Qualification Efforts for Photonic Integrated Circuits (PICs)." NASA, 2021, 32 pages.
Brecht et al. "Photon temporal modes: a complete framework for quantum information science." Physical Review X 5.4 (2015): 041017, 17 pages.
Chen et al. "A polarization encoded photon-to-spin interface." npj Quantum Information 7.1 (2021): 2, 6 pages.
Crook et al. "Purcell enhancement of a single silicon carbide color center with coherent spin control." Nano Letters 20.5 (2020): 3427-3434.
Desiatov et al. "Ultra-low-loss integrated visible photonics using thin-film lithium niobate." Optica 6.3 (2019): 380-384.
Dhara et al. "Heralded Multiplexed High-Efficiency Cascaded Source of Dual-Rail Entangled Photon Pairs Using Spontaneous Parametric Down-Conversion." Physical Review Applied 17.3 (2022): 034071, 26 pages.
Dowling "Quantum Optical Metrology—The Lowdown on High-N00N States." arXiv preprint arXiv:0904.0163 (2009), 38 pages.
Dror et al. "Experimental investigation of the influence of the relative position of the scattering layer on image quality: the shower curtain effect." Applied Optics 37.27 (1998): 6495-6499.
Duan et al. "Scalable photonic quantum computation through cavity-assisted interactions." Physical Review Letters 92.12 (2004): 127902, 4 pages.
Fejer "Nonlinear optical frequency conversion." Physics Today 47.5 (1994): 25-32, 8 pages.
Fldzhyan et al. "Compact linear optical scheme for Bell state generation." arXiv preprint arXiv:2105.06306 (2021), 8 pages.
Grice et al. "Eliminating frequency and space-time correlations in multiphoton states." Physical Review A 64.6 (2001): 063815, 7 pages.
Grice et al. "Spectral information and distinguishability in type-II down-conversion with a broadband pump." Physical Review A 56.2 (1997): 1627, 8 pages.
Gruneisen et al. "Modeling satellite-Earth quantum channel downlinks with adaptive-optics coupling to single-mode fibers." Optical Engineering 56.12 (2017): 126111-126111.
Heuck et al. "Controlled-phase gate using dynamically coupled cavities and optical nonlinearities." Physical Review Letters 124.16 (2020): 160501, 7 pages.
Heuck et al. "Photon-photon interactions in dynamically coupled cavities." Physical Review A 101.4 (2020): 042322, 28 pages.
Heuck et al. "Temporally and spectrally multiplexed single photon source using quantum feedback control for scalable photonic quantum technologies." New Journal of Physics 20.6 (2018): 063046, 14 pages.
Humphreys et al. "Deterministic delivery of remote entanglement on a quantum network." Nature 558.7709 (2018): 268-273, 19 pages.
Jones et al. "A high-speed optical link to entangle quantum dots." arXiv preprint arXiv:1310.4609 (2013), 9 pages.
Jones et al. "Design and analysis of communication protocols for quantum repeater networks." New Journal of Physics 18.8 (2016): 083015, 21 pages.
Kok et al. "Linear optical quantum computing with photonic qubits." Reviews of Modern Physics 79.1 (2007): 135, 40 pages.
Kok et al. "Postselected versus nonpostselected quantum teleportation using parametric down-conversion." Physical Review A 61.4 (2000): 042304, 10 pages.
Korzh et al. "Demonstration of sub-3 ps temporal resolution with a superconducting nanowire single-photon detector." Nature Photonics 14.4 (2020): 250-255.
Kwiat et al. "Ultrabright source of polarization-entangled photons." Physical Review A 60.2 (1999): R773, 4 pages.
Liao et al. "Satellite-to-ground quantum key distribution." Nature 549.7670 (2017): 43-47.
Lipka et al. "Massively-multiplexed generation of Bell-type entanglement using a quantum memory." Communications Physics 4.1 (2021): 46, 10 pages.
Merkouche et al. "Heralding multiple photonic pulsed bell pairs via frequency-resolved entanglement swapping." Physical Review Letters 128.6 (2022): 063602, 6 pages.
Merkouche et al., "Spectrally resolved four-photon interference of time-frequency-entangled photons," Physical Review A 105.2 (2022): 023708, 19 pages.
Mower et al. "Efficient generation of single and entangled photons on a silicon photonic integrated chip." Physical Review A 84.5 (2011): 052326, 7 pages.
Mower et al. "High-dimensional quantum key distribution using dispersive optics." Physical Review A 87.6 (2013): 062322, 12 pages.
Myilswamy et al. "Spectral compression using time-varying cavities." Optics Letters 45.20 (2020): 5688-5691.
Nguyen et al. "An integrated nanophotonic quantum register based on silicon-vacancy spins in diamond." Physical Review B 100.16 (2019): 165428, 22 pages.
Pant et al. "Rate-distance tradeoff and resource costs for all-optical quantum repeaters." Physical Review A 95.1 (2017): 012304, 17 pages.
Parniak et al. "Wavevector multiplexed atomic quantum memory via spatially-resolved single-photon detection." Nature Communications 8.1 (2017): 2140, 9 pages.
Pirandola "Satellite quantum communications: Fundamental bounds and practical security." Physical Review Research 3.2 (2021): 023130, 29 pages.
Pompili et al. "Realization of a multinode quantum network of remote solid-state qubits." Science 372.6539 (2021): 259-264.
Raha et al. "Optical quantum nondemolition measurement of a single rare earth ion qubit." Nature Communications 11.1 (2020): 1605, 6 pages.
Redjem et al. "Single artificial atoms in silicon emitting at telecom wavelengths." Nature Electronics 3.12 (2020): 738-743.
Rudolph "Why I am optimistic about the silicon-photonic route to quantum computing." APL Photonics 2.3 (2017), 20 pages.
Ruf et al. "Quantum networks based on color centers in diamond." Journal of Applied Physics 130.7 (2021), 21 pages.
Salem et al. "Optical time lens based on four-wave mixing on a silicon chip." Optics Letters 33.10 (2008): 1047-1049.
Schroder et al. "Scalable focused ion beam creation of nearly lifetime-limited single quantum emitters in diamond nanostructures." Nature Communications 8.1 (2017): 15376, 7 pages.
Stanisic et al. "Generating entanglement with linear optics." Physical Review A 96.4 (2017): 043861, 14 pages.
Trotta et al. "Wavelength-tunable sources of entangled photons interfaced with atomic vapours." Nature Communications 7.1 (2016): 10375, 7 pages.
Wan et al. "Large-scale integration of artificial atoms in hybrid photonic circuits." Nature 583.7815 (2020): 226-231, 19 pages.
Wehner et al. "Quantum internet: A vision for the road ahead." Science 362.6412 (2018): eaam9288, 11 pages.
Yin et al. "Entanglement-based secure quantum cryptography over 1,120 kilometres." Nature 582.7813 (2020): 501-505, 18 pages.
Yu et al. "Femtosecond pulse generation via an integrated electro-optic time lens." arXiv preprint arXiv:2112.09204 (2021), 25 pages.

(56) References Cited

OTHER PUBLICATIONS

Zhang et al. "Demonstration of a scheme for the generation of "event-ready" entangled photon pairs from a single-photon source." Physical Review A 77.6 (2008): 062316, 4 pages.
Zhang et al. "Integrated lithium niobate electro-optic modulators: when performance meets scalability." Optica 8.5 (2021): 652-667, 16 pages.
Zhang et al. "Monolithic ultra-high-Q lithium niobate microring resonator." Optica 4.12 (2017): 1536-1537.
Zhao et al. "High quality entangled photon pair generation in periodically poled thin-film lithium niobate waveguides." Physical Review Letters 124.16 (2020): 163603, 6 pages.
Zhong et al. "12-photon entanglement and scalable scattershot boson sampling with optimal entangled-photon pairs from parametric down-conversion." Physical Review Letters 121.25 (2018): 250505, 6 pages.
Zhong et al. "Quantum computational advantage using photons." Science 370.6523 (2020): 1460-1463.
Brecht et al., "Photon Temporal Modes: A Complete Framework for Quantum Information Science," Physical Review 5, 041017 (2015), 17 pages.

* cited by examiner

ZERO-ADDED-LOSS ENTANGLED PHOTON MULTIPLEXING SOURCE

CROSS-REFERENCE TO RELATED APPLICATION(S)

This application claims the priority benefit, under 35 U.S.C. 119(e), of U.S. Application No. 63/333,838, filed on Apr. 22, 2022, which is incorporated herein by reference in its entirety for all purposes.

GOVERNMENT SUPPORT

This invention was made with government support under CHE1839155 and EEC1941583 awarded by the National Science Foundation. The government has certain rights in the invention.

BACKGROUND

Entanglement distribution across distant nodes is fundamental to constructing quantum networks. Despite recent progress via optical fiber links, scaling quantum networks to global reach remains a formidable challenge.

One approach to increasing the entanglement rate over low efficiency ($\eta \ll 1$) elementary links is to use a deterministic Bell-state source at Charlie (C) midway between quantum repeaters (QRs) Alice (A) and Bob (B) in lieu of an entanglement swap. If A (B) post-selects on events where a photon passed at least path length $\overline{AC}$ ($\overline{BC}$), in the regime where the QRs are memory-limited, the average entanglement rate $\overline{\Gamma}$ improves to $\propto\sqrt{\eta}$ compared to a $\propto\eta$ in protocols where C performs a local Bell state measurement (BSM). Despite the increase in QR complexity, this midpoint source scheme's potential of increasing $\overline{\Gamma}$ by $\mathcal{O}(1/\sqrt{\eta})$ has motivated research efforts to produce entangled photon pair sources, which should be near-deterministic for the advantage to persist. Leading efforts are based on cascaded atomic sources or spontaneous parametric down conversion (SPDC) sources. While the SPDC has been used for heralded production of Bell pairs, existing SPDC sources cannot provide the efficiency or fidelity desired for near-term quantum networks.

SUMMARY

The inventive technology includes a method of distributing quantum entanglement to first and second quantum receivers. In this method, the first quantum receiver receives a first photon in a heralded photonic Bell pair and a classical heralding message encoding frequency information about the heralded photonic Bell pair. In response to the classical heralding message, a mode converter of the first quantum receiver converts the first photon from a first mode to a second mode different than the first mode and selected based on a spin qubit. Then a switch or other suitable device or component directs the first photon in the second mode to the spin qubit.

Converting the first photon from the first mode to the second mode may comprise converting the first photon from a first wavelength to a first photon at a second wavelength different than the first wavelength and resonant with the spin qubit. In such a case, directing the first photon at the second wavelength to the spin qubit may include routing the first photon at the second wavelength through a tree of Mach-Zehnder interferometers integrated with a solid-state host of the spin qubit. Alternatively, the first and second modes can be first and second temporal modes.

Such a method can also include generating the heralded photonic Bell pair at a satellite and transmitting the first and second photons of heralded photonic Bell pair from the satellite to the first and second quantum receivers, respectively. The heralded photonic Bell pair can be generated using a broadband spontaneous parametric down conversion (SPDC) source. Generating the heralded photonic Bell pair may also include combining two unheralded photonic Bell pairs using a beam splitter and a spectrally resolved photon detector array.

The heralded photonic Bell pair can be generated in one of a plurality of wavelength-division multiplexed (WDM) channels, in which case the method can also include determining a frequency of that WDM channel and encoding the frequency of that WDM channel in the classical heralding message.

In some cases, a quantum state encoded by the heralded photonic Bell pair can be transferred to the spin qubit at the first quantum receiver. In these cases, the first quantum receiver can determine if the second quantum receiver received a second photon of the heralded photonic Bell pair. If the second quantum receiver has received the second photon of the heralded photonic Bell pair, the quantum state can be transferred from an electron spin of the spin qubit to a nuclear spin.

The heralded photonic Bell pair can be a first heralded photonic Bell pair, in which case, the method may also include, at the first quantum receiver after receiving the first heralded photonic Bell pair, attempting, to detect a first photon in a second heralded photonic Bell pair without re-initializing the spin qubit.

The inventive technology may also be embodied in a quantum receiver that includes spin qubits (e.g., negatively charged silicon vacancies in diamond), a mode converter, and a switch in optical communication with the spin qubits and the mode converter. If desired, the spin qubits, mode converter, and switch can be integrated in a photonic integrated circuit. In operation, the mode converter converts a first photon in a heralded photonic Bell pair from a first mode to a second mode different than the first mode. This second mode is selected based on one of the spin qubits in response to a classical heralding message accompanying the first photon in the heralded photonic Bell pair. And the switch routes the first photon from the mode converter to the one of the spin qubits.

The mode converter can be configured to convert the first photon from a first wavelength to a second wavelength different than the first wavelength and resonant with the one of the spin qubits. The mode converter comprises an array of ring resonators comprising $\chi^{(2)}$ nonlinear material. Each ring resonator in the array of ring resonators can be resonant at a different wavelength.

A system for distributing quantum entanglement may include two of these quantum receivers (first and second quantum receivers) in optical communication with a quantum transmitter. The quantum transmitter can generate the heralded photonic Bell pair and a classical heralding message. It can transmit a first photon in the heralded photonic Bell pair and the classical heralding message to the first quantum receiver and a second photon in the heralded photonic Bell pair and the classical heralding message to the second quantum receiver. The quantum transmitter can be at a satellite and the first and second quantum receivers can be at first and second ground stations, respectively. The quantum transmitter can include a first SPDC source to generate a first signal photon and a first idler photon, a second SPDC source to generate a second signal photon and a second idler photon, and a Bell state analyzer, in optical communication with the first and second SPDC sources, to perform a Bell state measurement on the first and second idler photons and to generate the classical heralding message based on the Bell state measurement.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters refer to like features (e.g., functionally and/or structurally similar elements).

Figure 3A:
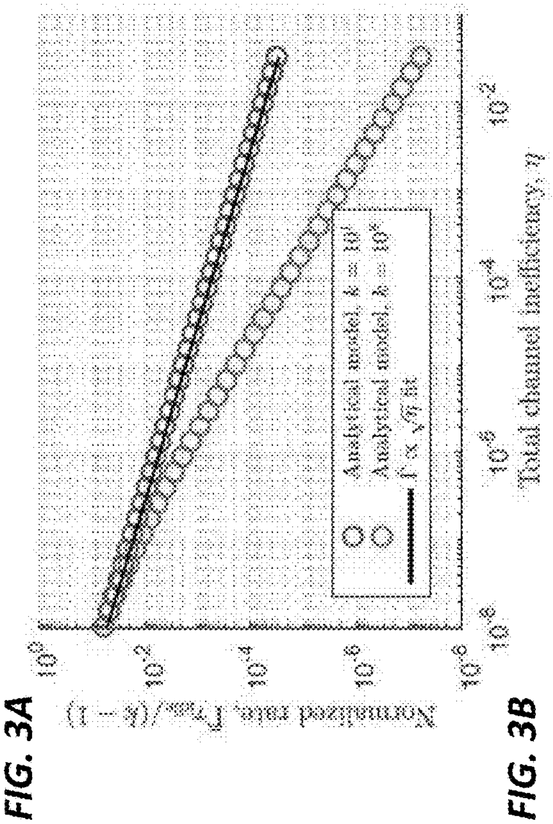
FIG. 3A is a plot of the normalized entanglement generation rate as a function of the total channel efficiency $\eta$ for the entanglement distribution architecture of FIG. 1. In the memory-limited regime ($k=10^1$), the normalized rate $\Gamma\tau_{idle}/(k-1)$ scales $\propto\sqrt{\eta}$ whereas it scales $\propto\eta$ in the source-limited regime ($k=10^8$).
Figure 3B:
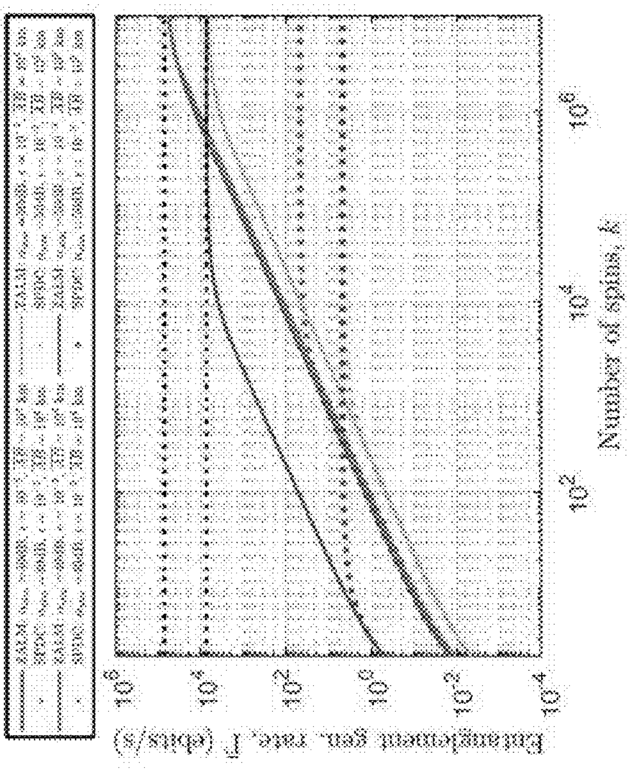

FIG. 3B is a plot of the calculated entanglement generation rate versus the number of spins k for both zero-added-loss multiplexing (ZALM) and spontaneous parametric down conversion (SPDC) with varying amounts of infidelity $\epsilon\in\{10^{-2}, 10^{-3}\}$ and total downlink atmospheric attenuation $\alpha_{atm}=\{40,50\}$ dB for a nuclear spin coherence time >>1 s. The trace that asymptotically approaches an entanglement generation rate of $10^4$ represents $\overline{AB}=10^2$ km.

DETAILED DESCRIPTION

Here, we disclose a temporal-spectral multiplexed Bell pair source without the switching loss that affects spatially or purely temporally multiplexed heralded Bell pair sources. This temporal-spectral multiplexed Bell pair source, or zero-added-loss multiplexing (ZALM) Bell pair source, leverages large spontaneous parametric down conversion (SPDC) phase-matching bandwidths to achieve high transmission rates via spectral multiplexing.

Quasi-deterministic ZALM Bell pair sources are useful for quantum networks. They are especially useful for long-distance entanglement distribution via space-to-ground optical links, which is difficult for several reasons. Satellite-mediated entanglement distribution between distant ground stations has to contend with extreme channel conditions, including large transmission loss, channel instability, and heralding latency. Two choices for satellite-based optical transmission links are the downlink (space to ground) and uplink (ground to space) configurations. Despite the relative ease of making Bell state measurements (BSMs) in space, the uplink configuration suffers from pointing instability due to the "shower-curtain effect"—the angular spread is greater going from a denser medium (Earth's atmosphere) to a less dense medium (outer space) than vice versa—so the downlink configuration tends to be more efficient.

Satellite-Mediated Entanglement Distribution with ZALM Bell Pair Sources

Figure 1:
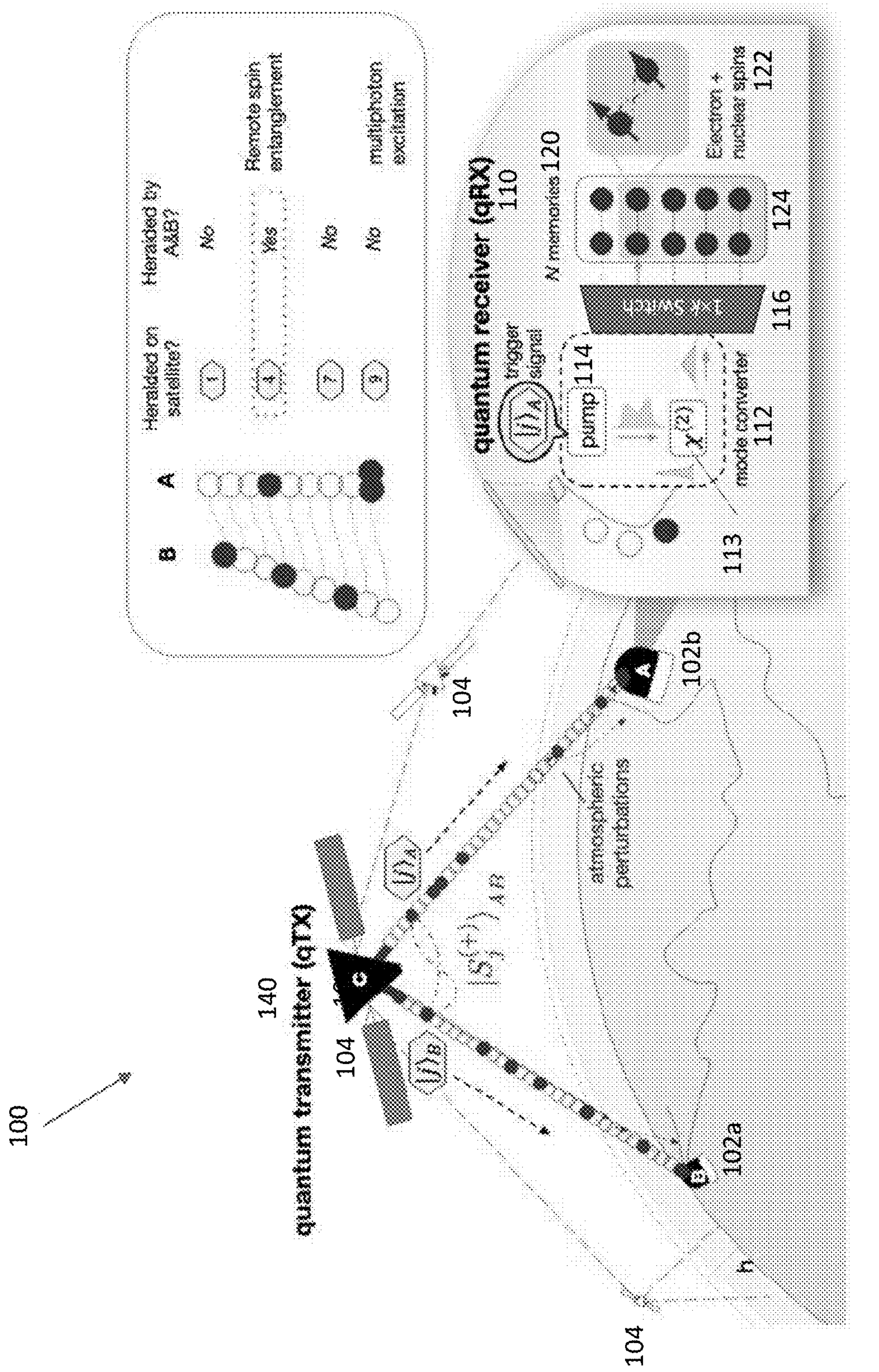
FIG. 1 shows a satellite-assisted entanglement architecture.

FIG. 1 shows a satellite-mediated entanglement distribution architecture 100 between distant ground stations 102*a* and 102*b* (collectively, ground stations or terrestrial stations 102) via one or more satellites 104 in a global-scale quantum network. Each satellite 104 includes a corresponding quantum transmitter (qTX) 140, and each terrestrial station 102 hosts a corresponding quantum receiver (qRX) 110 and, optionally, a quantum repeater in the quantum network. (The quantum transmitters 140 can also be located on Earth and coupled to the quantum receivers 110 via fiber optic links or other suitable links. Likewise, one or more of the quantum receivers 110 can be on satellites 104 in outer space.) This architecture 100 integrates the merits of both satellite-based channels and efficient spin-photon interfaces containing solid-state spin centers (e.g., negatively charged silicon vacancy $SiV^-$ centers in diamond) in the quantum receivers 110 at the ground stations 102 to provide heralded spin-spin entanglement.

Each quantum receiver 110 includes a mode converter 112 and a memory bank 120 that contains N multiplexed spin qubits 122. These spin qubits 122 can be spatially multiplexed—each spin qubit 122 can be in a different location in a solid-state host or in a different solid-state host—and/or frequency multiplexed—each spin qubit's optical transition can be resonant at a different resonance frequency, e.g., due to different fields experienced by the different spin qubits 122. The mode converter 122 comprises a pump source 114, such as a mode-locked laser, that is optically coupled to a $\chi^{(2)}$ nonlinear medium 113 and triggered by a classical heralding signal from the quantum transmitter 140. Each quantum receiver 110 also includes a 1×k switch 116 that switches the output of the $\chi^{(2)}$ nonlinear medium 113 among the k spin qubits 122 in the memory bank 120. This 1×k switch 116 can be implemented with a Mach-Zehnder interferometer splitter tree, micromirror array, micro-electro-mechanical system (MEMS) switching array, or other suitable switching technology.

Each spin qubit 122 can be implemented as an electron-nuclear spin pair, such as a color center, in a solid-state host 124. For example, each spin qubit 122 can be implemented as a vacancy in diamond, such as a negatively charged silicon-vacancy center ($SiV^-$), or in other host material compatible for Duan-Kimble type loading. An $SiV^-$ has an electron spin that exhibits long coherence times and cooperativity C>100 when coupled to a nanocavity that acts as a spin-photon interface. Furthermore, the $SiV^-$'s electron spin has convenient access to a nearby nuclear spin with even longer coherence times. A quantum SWAP operation between the $SiV^-$'s electron and nuclear spins via hyperfine interaction hence reduces decoherence while the ground station 102 waits for subsequent photons from the satellite 104.

Silicon vacancies and other diamond color centers can be heterogeneously integrated into PICs and can be scaled up for use in a multiplexed quantum repeater network, where each ground station 102 is one of the quantum repeaters. Despite solid-state emitters such as $SiV^-$ manifesting spectral inhomogeneity, post-selecting candidates within a narrowed inhomogeneous distribution and subsequent in-situ tuning enabled by an active PIC platform ensure maximal coupling in the spin-cavity systems. Specifically, negatively charged silicon vacancies can be strain-tuned to align their zero-phonon lines (ZPLs), while the nanophotonic cavities' resonances can be gas-tuned.

As described in greater detail below with respect to FIG. 2A, the quantum transmitters 140 in the satellites 104 are zero-added-loss multiplexing (ZALM) Bell pair sources. They can leverage the broad phase-matching bandwidth $\sigma_{pm}$ of continuous-wave (CW) pumped or pulse-pumped spontaneous parametric down-conversion (SPDC) sources and use wavelength demultiplexers to herald photonic Bell pair creations in known frequency bins with high bandwidth. These quantum transmitters 140 do not use active switch arrays and therefore do not suffer from losses that can occur with switching.

In operation, the quantum transmitters 140 transmit wavelength-division multiplexed photonic Bell pairs to the quantum receivers 110 at the ground stations 102. They also emit classical heralding messages encoding the frequency and timing information, $|j\rangle_{A,B}$, of the photonic Bell pairs with the halves of the photonic Bell pairs that they transmit to the ground stations 102. In FIG. 1, for example, the satellite 104 labeled Charlie (C) transmits heralded photonic Bell pairs, e.g., at different wavelengths in the telecommunications C-band, to ground stations 102$a$ and 102$b$, labeled Alice (A) and Bob (B), respectively. Each heralded photonic Bell pair is in the form of a polarization-encoded photonic Bell state $$|S_j^{(+)}\rangle_{AB}.$$

The quantum transmitter 140 also transmits classical heralding messages encoding the Bell states' frequency and, optionally, timing information $j_{A,B}$ to the quantum receivers 110. As described in greater detail below, the quantum transmitter 140 includes a pair of SPDC sources, each of which generates an unheralded photonic Bell pair that includes a signal photon and an idler photon whose wavelengths/frequencies are correlated and may both be in the telecommunications C-band (1530-1565 nm). A Bell state analyzer in the quantum transmitter 140 performs a Bell state measurement on the idler photons by interfering the idler photons and detected the interference in wavelength-demultiplexed detection channels. Due to frequency correlation between the signal and idler photons, detection information about the wavelength-demultiplexed channel of the detected idler photon provides frequency information about the corresponding signal photon transmitted to the quantum receiver 110. The net result of the Bell state measurement is entanglement of the signal photons and a classical heralding message with frequency information about the signal photons—in other words, a heralded photonic Bell state. The quantum transmitter 140 transmits these classical heralding messages with the halves of the corresponding photonic Bell state to the terrestrial quantum receivers 110 at ground stations 102$a$ and 102$b$.

Upon arrival at A or B, each Bell pair photon enters the corresponding mode converter 112, which performs frequency and bandwidth conversion for efficient cavity-based spin-photon interaction. This frequency and bandwidth conversion by the mode converter 112 can be triggered by the classical heralding signal that the quantum transmitter 140 transmits with the Bell pair photon. Subsequently, the photon interacts with the corresponding spin-based memory 120 and is detected to complete the quantum state transfer. After heralding on photons from the same Bell state, A and B share an entangled pair between their respective spins.

The filled circles at the upper right in FIG. 1 represent photons successfully heralded on the satellite 104 (C) and at the ground stations 102$a$ and 102$b$ (A and B), while the open circles represent signal photons from the satellite 104 lost en route to the ground stations 102$a$ and 102$b$. Successful heralding of a photonic Bell pair on the satellite 104 and the ground stations 102$a$ and 102$b$ indicates remote spin entanglement of spin qubits 122 in the quantum receivers 110 at the ground stations 102$a$ and 102$b$ (A and B). The two bunched photons at A signify multiphoton emission due to imperfection in the quantum transmitter 140 at the satellite 104.

The architecture 100 in FIG. 1 contends with extreme channel conditions, including large transmission loss, channel instability, and heralding latency. It uses k spatially or frequency-multiplexed qubits in quantum receivers 110 on the ground and ground-satellite (GS) transmission in the telecommunications C-band for compatibility with space-qualified photonics. Frequency conversion by the mode converters 112 at the quantum receivers 110 translates the photonic Bell pairs from the telecommunications C-band to wavelengths suitable for spin-photon coupling to the spin-pair memories. And the switch 116 directs each frequency-converted signal photon to the corresponding spatially multiplexed spin qubit 122.

Increasing or maximizing the heralded success probability $p_{success}$ over the various quantum communications protocol choices for near-term realistic parameters favors two-photon-heralding schemes to avoid the phase stability requirement of single-photon heralding schemes and satellite-to-ground downlinks to reduce or minimize pointing instability due to the shower curtain effect. Based on realistic parameters, a full-stack numerical analyses suggests that this architecture 100 at memory multiplexing $k=10^4$ could produce $>10^2$ entangled bits per second (ebits/s) with Bell state fidelity exceeding 99%. The architecture 100 in FIG. 1 therefore represents a feasible near-term approach to constructing a global-scale quantum repeater network.

Photonic Sources of High-Quality Dual-Rail Entangled Qubits

Figure 2A:
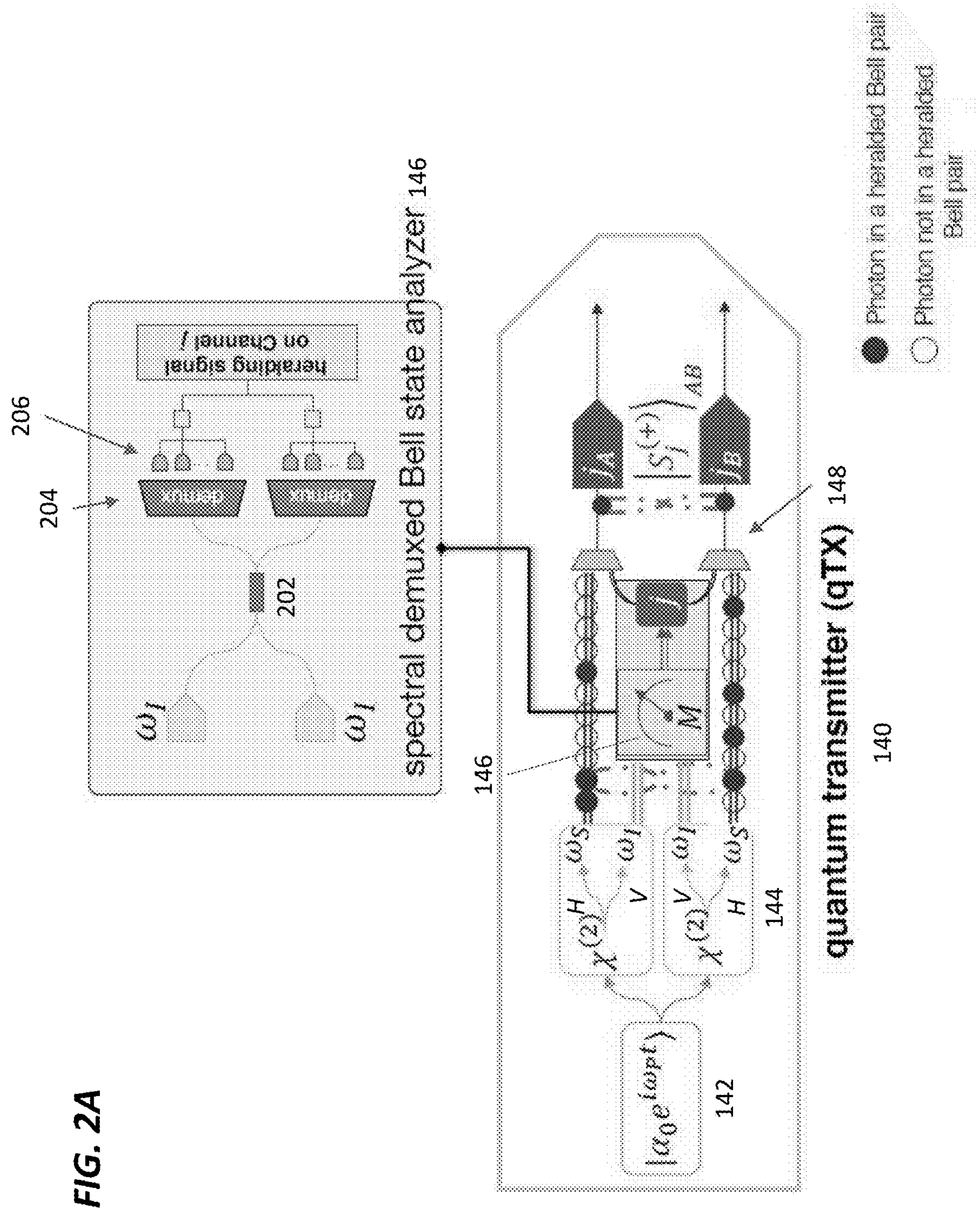
FIG. 2A illustrates a quantum transmitter frequency-multiplexed Bell-pair generation source includes a pair of SPDC sources pumped by a continuous-wave (CW) or pulsed source. A spectral demultiplexed Bell state analyzer heralds the Bell-pair creation and sends out classical messages encoding frequency and timing information.

FIG. 2A illustrates one implementation of the quantum transmitter 140 suitable for use in the entanglement distribution architecture of FIG. 1. (Other implementations, including four-wave mixing implementations, are also possible and may have different advantages and disadvantages.) In this implementation, the quantum transmitter 140 uses SPDC for quasi-deterministic Bell pair production. The quantum transmitter 140 includes a pair of SPDC sources, depicted in FIG. 2A as a single pump source 142, such as a CW laser (e.g., at 800 nm) or a mode-locked laser, that pumps a pair of $\chi^{(2)}$ nonlinear crystals 144. (Alternatively, the pump source 142 can pump different regions of the same $\chi^{(2)}$ nonlinear crystal.) The $\chi^{(2)}$ nonlinear crystals 144 are coupled in turn to a spectrally demultiplexed Bell state analyzer 146 and a pair of frequency multiplexers 148. If desired, some or all of the components in the quantum transmitter 140 can be integrated into one or more photonic integrated circuits (PICs).

In operation, each $\chi^{(2)}$ nonlinear crystal 144 performs SPDC of pump photons from the pump source 142 to produce signal and idler photons at angular frequencies of $\omega_S$ and $\omega_I$, respectively, in orthogonal polarization states (e.g., horizontal (H) and vertical (V) polarization states). The signal and idler photons produced by each SPDC source are entangled with each other, so the output of each SPDC source (i.e., one signal photon and one idler photon) is an unheralded photonic Bell pair. The signal photons' angular frequencies may be selected to be in the telecommunications C band, which spans a wavelength range of about 1530 nm to 1565 nm. The quantum transmitter 104 can use a large phase-matching bandwidth $\sigma_{pm}$ (e.g., ranging from 100 GHz to 1 THz) for SPDC, along with the large coherence time (>1 μs) corresponding to the narrow linewidth (e.g., <1 MHz) of a CW pump source 142. The multiplexers 148 multiplex the signal photons onto optical channels or links that connect the quantum transmitter 140 to the optical receiver(s) 110.

The spectrally demultiplexed Bell state analyzer 146 performs an intermediate linear optical Bell state measurement (BSM) on the idler photons to provide a heralding trigger for entanglement generation. The Bell state analyzer 146 includes a beam splitter 202 and a pair of demultiplexers 204. The beam splitter 202 interferes/directs the idler photons from the $\chi^{(2)}$ nonlinear crystals 144 to the demultiplexers 204, which demultiplex the output beams from the beams splitters 202 into wavelength division multiplexing (WDM) or ultra-dense wavelength division multiplexing (uDWDM) channels. Detectors 206 optically coupled to the demultiplexers 204 perform photon-number-resolved detection separately on each uDWDM channel. The uDWDM channels are spaced 12.5 GHz apart and span the 1 THz phase-matching bandwidth; hence there are 80 channels at a wavelength of around 1550 nm in the telecommunications C-band.

The signal and idler photons in a given unheralded photonic Bell pair may be in different, complementary frequency bins or uDWDM channels. For examples, the signal photon may be in uDWDM channel 40 and the idler photon in uDWDM channel 41. Or the signal and idler photons may be in uDWDM channels 30 and 51. Because the frequencies and hence the uDWDM channels of the signal and idler photons in a given unheralded photonic Bell pair are correlated, knowing the idler photon's frequency bin or uDWDM channel provides information about the frequency bin or uDWDM channel of the correlated signal photon.

The demultiplexed detection serves as a heralding trigger and provides both frequency and optionally timing information about the heralded Bell pair (the signal photons). For a pulsed pump source 142, timing information is provided by the master clock, the pump itself. Because the signal and idler photons of the heralded Bell pair are anti-correlated in frequency, detection of a photon in a given channel heralds the presence of a photon in the complementary channel. Down-conversion in each $\chi^{(2)}$ nonlinear medium 144 yields the following quantum state in the output signal-idler modes:

$$|\psi\rangle = c_0|0,0\rangle + c_1\int J(\omega_S,\omega_I)a_S^\dagger(\omega_S)a_I^\dagger(\omega_I)|0,0\rangle + c_2\int J(\omega_S,\omega_I)^2 a_S^{\dagger 2}(\omega_S)a_I^{\dagger 2}(\omega_I)|0,0\rangle \quad (1)$$

Here, $c_j$ are the state coefficients and $$\hat{a}^\dagger_{\omega_k}$$

is the corresponding creation operator, where k=S, I denotes signal, idler. $J(\omega_S, \omega_I)$ represents the joint spectral amplitude, which is a product of pump spectral function and the phase matching function of the nonlinear medium.

The Bell state analyzer 146 in the quantum transmitter 140 then performs the BSM by interfering the idler photons from signal-idler beam pairs from each SPDC source ($\chi^{(2)}$ nonlinear medium 144). The spectrally synchronized BSM that yields one of the desirable photon click patterns (say, on channel j) heralds an entangled state with a spectral description given as $$\begin{aligned}\left|S_j^{(\pm)}\right\rangle \propto \int_{\vec{\Omega}_j} d\vec{\omega}\Big[\big(&J(\omega_{A_1},\omega_{A_1'})J(\omega_{B_2'},\omega_{B_2})\hat{a}^\dagger_{A_1}(\omega_{A_1})\hat{a}^\dagger_{B_2}(\omega_{B_2}) + \\ &(-1)^{m_1}J(\omega_{A_2'},\omega_{A_2})J(\omega_{B_1'},\omega_{B_1})\hat{a}^\dagger_{A_2}(\omega_{A_2})\hat{a}^\dagger_{B_1}(\omega_{B_1})\big) + \\ &(-1)^{m_2}\big(J(\omega_{A_1},\omega_{A_1'})J(\omega_{A_2},\omega_{A_2'})\hat{a}^\dagger_{A_1}(\omega_{A_1})\hat{a}^\dagger_{A_2}(\omega_{A_2}) + \\ &(-1)^{m_1}J(\omega_{B_2'},\omega_{B_2})J(\omega_{B_1'},\omega_{B_1})\hat{a}^\dagger_{B_1}(\omega_{B_1})\hat{a}^\dagger_{B_2}(\omega_{B_2})\big)\times \\ &\times|0\rangle_{A_1}|0\rangle_{A_2}|0\rangle_{B_1}|0\rangle_{B_2}\end{aligned} \quad (2)$$

Here, the modes $A_1$, $A_2$ ($B_1$, $B_2$) represent the pair of modes that comprise the qubit transmitted to Alice (Bob), and $\int_{\vec{\Omega}_j} d\vec{\omega}$ represents integrals over the j-th detection channel's spectral extents characterized by the vector $\vec{\Omega}_j$. Additionally, parity bits m1 and m2 depend on the detection pattern and determine the distributed entangled pair.

In the heralded state, the first two terms in Eq. (2) represent the component that has exactly one photon on Alice's and Bob's synchronized channels. They describe the spectrum of a $(|0,1\rangle_A|1,0\rangle_B \pm |0,1\rangle_A|1,0\rangle_B)/\sqrt{2}$ Bell state. The other terms in Eq. (2) represent a state in which Alice (Bob) receives both photons and Bob (Alice) receives none, i.e., a state equivalent to a $(|1,1\rangle_A|0,0\rangle_B \pm |0,0\rangle_A|1,1\rangle_B)/\sqrt{2}$ state. In this state, each pair of modes contains terms that do not belong to the dual-rail qubit basis; these state components limit the fidelity of the generated entangled state.

In the entanglement distribution architecture 100 of FIG. 1, photonic entanglement generated by the quantum transmitter 140 is transmitted from the satellite 104 to the pair of ground stations 102*a* and 102*b*, along with classical information about the detection channels and the coincidence time relative to the system clock. The quantum transmitter's emission rate is governed by the photon bandwidth and the jitter time of the photodetectors in the quantum transmitter's Bell state analyzer (described below with respect to FIG. 2A). The parameters of the transmission and collection optics in the satellite 104 and ground station(s) 102 can be combined into a single channel loss parameter for each satellite-ground link. This assumes that the architecture 100 has suitable timing synchronicity, adaptive optics, pointing and tracking, Doppler compensation, and beam forming to transmit and receive the photon entanglement and classical information without affecting the emitted photonic state. Other suitable quantum transmitters may generate entangled photon pairs in bases other than polarization, such as the time-energy basis, which has been used in quantum key distribution experimentally.

Mode Conversion for Frequency and Bandwidth Matching

The photonic Bell state pairs from the quantum transmitter 140 generate entanglement between spin qubits 122 at quantum receivers 110 at different ground stations 102. For an efficient cavity-based spin-photon interaction at each quantum receiver 110, the photons in the photonic Bell state pairs should be (1) resonant with the spin qubit's optical transition and (2) narrow in bandwidth relative to the linewidth of the spin qubit's optical transition. (In this case, the optical transition is subjected to Purcell enhancement due to coupling with a nanophotonic cavity that acts an interface between the incident photon and the spin qubit.) The mode converter 112 in each quantum receiver 110 performs both frequency conversion and pulse shaping via a sum-frequency generation (SFG) process that converts a photon received from the satellite 104 (Charlie) into a photon with both of these attributes.

Figure 2B:
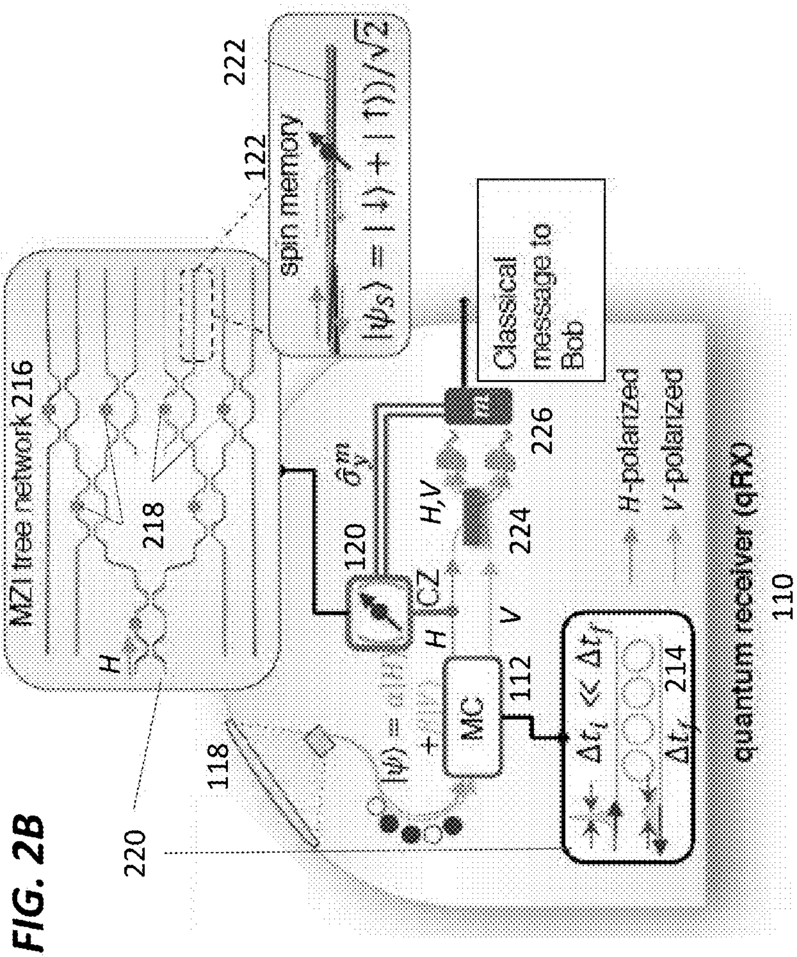
FIG. 2B shows a quantum receiver implemented in a photonic integrated circuit (PIC) containing a mode converter and a Mach-Zehnder interferometer (MZI) tree network that routes a photon from a quantum transmitter to an arbitrary channel in a spin qubit memory bank. Each channel is a diamond nanocavity coupled with an electron spin that interacts with the photon.

FIG. 2B shows one possible implementation of the quantum receiver 110 in the entanglement distribution architecture 100 of FIG. 1. This implementation includes collection optics 118 that are optically coupled to a PIC 220 that contains the mode converter 112, switch (in the form of a Mach-Zehnder interferometer (MZI) tree network 216), and spin-qubit memory bank 120. Each spin qubit 122 in the spin-qubit memory bank 120 is electromagnetically coupled to a spin-photon interface in the form of a nanophotonic cavity 222 defined by Bragg gratings formed in a corresponding waveguide in the PIC 220. Other implementations are also possible; for instance, these components can be on different PICs or implemented as discrete components connected via fiber-optic or free-space optical links.

This mode converter 112 in this implementation of the quantum receiver 110 includes an array of ring resonators 214 made of $\chi^{(2)}$ nonlinear material. The array includes one ring resonator 214 for each uDWDM channel into which the quantum transmitter 140 could emit a photon. Each ring resonator 214 has a high quality (Q) factor (e.g., about 106, which is possible with SiN, $LiNbO_3$, and other visible-wavelength PIC platforms) and supports three resonance frequencies $\omega_a$, $\omega_b$, and $\omega_c$, where $\omega_a$ is the corresponding uDWDM channel frequency (e.g., from 1530-1565 nm), $\omega_b$ is the target frequency corresponding to the optical transition of the spin qubit 122 in the memory 120 (e.g., 737 nm). $\omega_c$, pumped by a strong classical laser field from the pump source 114 (FIG. 1), is chosen to satisfy energy conservation and enable frequency up-conversion: $\omega_a+\omega_c=\omega_b$. $\omega_a$ and $\omega_c$ may be different for each ring resonator 214, whereas $\omega_b$ is the same for every ring resonator if the optical transitions of the spin qubits are all at the same frequency.

In operation, a waveguide in the PIC 220 evanescently couples an incoming Bell pair photon from the collection optics 118 into the ring resonator 214 for the corresponding uDWDM channel. At the same time, the collection optics 118 receive an incoming classical heralding message $|j\rangle_{A,B}$ from the quantum transmitter 140. The pump source 114 emits a classical pump field at $\omega_c$ in response to and synchronization with this classical heralding message. The information in the classical heralding message is used to choose the classical pump field's center frequency $\omega_c$ and pulse shape, which can be picked to reduce the bandwidth (e.g., to about 100 MHz) of the target mode b.

Changing the bandwidth of a signal photon through a second-order nonlinear interaction (sum-frequency generation) inside one of the ring resonators 214 can be considered a temporal mode conversion. Temporal modes are generally used to describe the time domain representation of the quantum wave packet. Like frequency modes, temporal modes can be defined for looking at the quantum state of light.

The pulse shape of the classical pump field can be pre-characterized for each uDWDM frequency channel/ring resonator 214. For example, a classical message that says "idler photon detection happened in a channel corresponding to signal photon uDWDM channel 5" would cause the pump source 114 to emit a classical pump field with a pulse shape corresponding to uDWDM channel 5. Another waveguide in the PIC 220 evanescently couples the classical pump field into the ring resonator 214. The Bell pair photon and the classical pump field interact through a sum-frequency generation process in the ring resonator's $\chi^{(2)}$ nonlinear material to produce a photon at a wavelength resonant with one of the spin qubits 122 in the memory bank 120 at the quantum receiver 110. Because the sum-frequency generator process is purely quantum mechanical and coherent, the resulting photon (e.g., at A) remains entangled with the other signal photon in the corresponding photonic Bell pair (e.g., at B).

Spin-Photon Interface for Quantum Memory Storage

As mentioned above, the spin qubits 122 can be implemented as negatively charged silicon vacancy centers ($SiV^-$) in diamond and integrated into the same PIC that contains the ring resonators 214. Under an applied magnetic field and accounting for only Zeeman splitting, the energy ground state of a $SiV^-$ splits into two electron spin states. One of the two optical transitions with the $SiV^-$'s excited state is coupled with a mode of a nanophotonic cavity 222 containing the $SiV^-$. With a nearby nuclear spin, hyperfine splitting further divides the two electronic spin states to a total of four levels. Effectively, the electron spin acts as a broker qubit that interfaces with the photon from the mode converter 112, and subsequently transfers the qubit state to the nuclear spin, which serves as a long-lived atomic memory. In other words, each $SiV^-$'s electron spin can map onto a neighboring nuclear spin for long memory storage via hyperfine interaction, reducing or minimizing decoherence while the quantum receiver 110 waits for subsequent photons from the quantum transmitter 140.

As shown in FIG. 2B, the 1×k switch 116 (FIG. 1) that couples the output of the mode converter 112 to the solid-state spin qubit memory bank 120 can be integrated in the same PIC 220 as the solid-state spin qubit memory bank 120. In this example, the 1×k switch 116 is implemented as a Mach-Zehnder interferometer (MZI) splitter tree network 216 that includes electro-optic modulators 218 formed of lithium niobate ($LiNbO_3$) for high-bandwidth operations based on the electro-optic effect. The electro-optic modulators 218 can have greater than GHz bandwidths to allow for rapid routing of photons among the different paths through the MZI splitter tree network 216 to the spin qubits 122 in the spin qubit memory bank 120.

In operation, the mode converter 112 up-converts an incoming signal photon from a wavelength of about 1550 nm to a wavelength of about 737 nm and reduces the photon bandwidth to 200 MHz, which is taken to be much narrower than each spin qubit's Purcell-broadened linewidth. The up-converted photons are in horizontally and vertically polarized modes $|H\rangle$ and $|V\rangle$ as illustrated in FIG. 2B.

Mode $|H\rangle$ enters the MZI tree network 216 interposed to the array of nanophotonic cavities 222 that contain the k spin qubits 122. Modulators 218 route mode $|H\rangle$ to arbitrary spins 122 for memory multiplexing. The photon then reflects off the corresponding nanophotonic cavity 222, acquiring a phase that depends on the state of the spin qubit 122 in the nanophotonic cavity 222 and effectively achieving spin-photon entanglement. Mode $|V\rangle$, on the other hand, maintains a constant phase. The two modes interfere at a beam splitter 224 and are subsequently detected by a balanced photodetector 226 coupled to the beam splitter's outputs to herald photon-to-spin mapping. (The interference itself indicates whether the photons are in the same polarization mode. In other words, if the detection pattern indicates that two-photon interference has happened, then the signal photons are in the same polarization mode.) Since both polarization modes co-propagate in the PIC 220, the nanophotonic interface guarantees phase stability for high-fidelity quantum state transfer between the photonic and the spin qubits.

Entanglement Generation Fidelity and Efficiency

The spin-spin Bell state fidelity can be affected by imperfections in the quantum transmitter, quantum receivers, and the lossy channels between the quantum transmitter and quantum receivers. There is also a trade-off between the fidelity, efficiency, and rate of entanglement generation. Since initializing spin qubits is time-consuming, the entanglement generation rate can be increased by not re-initializing the spins after every entanglement generation attempt (where photons have propagated from the quantum transmitter to each quantum receiver). However, if a photon is lost after reflecting off the nanophotonic cavity that contains a spin qubit, this unheralded qubit loss error projects the spin qubit into a maximally mixed state. As a result, the average spin-spin Bell state fidelity decreases as the number of entanglement generation attempts increases. Setting a maximum number of attempts $N_{max}$ before re-initializing the spin qubits limits or minimize this photon loss infidelity $\epsilon$.

Successful entanglement between quantum receivers Alice and Bob occurs when Alice and Bob each detect a photon from the same Bell pair. But every incoming photon is either (1) detected with probability $p_{det}$, (2) lost before reaching the spin with probability most, or (3) lost after reaching the cavity with probability $p_e$. Since $p_{lost} \gg \{p_{det}, p_e\}$, the time for each entanglement attempt can be reduced by not re-initializing the spin qubits in the quantum receivers' memory banks after every entanglement attempt. A complication of not re-initializing the spins is that a photon that is lost after interacting with the spin-cavity system can cause an unheralded error, i.e., the environment projects the spin into a maximally mixed state $\rho_{mixed}=\mathbb{I}/2$. This suggests that spin-spin entanglement fidelity can be optimized by constraining the number of attempts before re-initializing the spins qubits as explained below.

For simplicity, assume that the quantum transmitter (Charlie) sends Bell state photons at a fixed transmission rate $1/\tau_0$. The probability of at least one unheralded error occurring in the first m−1 attempts conditioned on detector clicks on the mth attempt is $P_{error}(m, m)=1-(\xi p_{lost}/(1-p_{det}))^{2(m-1)}$ where $\xi$ is the probability of both Alice and Bob receiving photons. $1-\xi$ corresponds to having only a single photon transmitted from the quantum transmitter due to imperfections. Therefore, the probability of error over N time bins is $$P_{error} = \sum_{m=1}^{N} P_{error}(m, m) P_{click}(m, m),$$

$$\text{where } P_{click}(m, m) = \left(1 - p_{det}^2\right)^{m-1} p_{det}^2$$

is the probability that Alice and Bob experience their first simultaneous detector clicks on the mth entangled photon pair. The average state fidelity is the overlap between the transferred spin-spin state and the ideal Bell state $|\psi^{\pm}\rangle$ : $\mathcal{F} = \langle \psi^{\pm}|(1-P_{error})\rho_{0,eff}+P_{error}\rho_{mixed}|\psi^{\pm}\rangle$, where $\rho_{0,eff}$ is the spin-spin state after cavity interaction. Imposing a constraint on the infidelity $\epsilon$ due to unheralded photon loss makes it possible to solve for the maximum number of time bins $N_{max}$ before the spin qubit should be re-initialized.

Next, consider the entanglement generation rate for a memory multiplexed architecture where each quantum receiver has k spin qubits as described above with respect to FIGS. 1 and 2B. The entanglement generation rate and fidelity depend on how incoming photons are distributed between the spins. In one framework, only one spin qubit at the quantum receiver is initialized and ready to accept photons from the quantum transmitter at any time. If a photon is successfully written to one of Alice's spin qubits, Alice communicates with Bob to determine if Bob successfully detected the other photon from the same Bell pair. If both photons were detected successfully, Alice transfers the state of the electron spin to a nuclear spin for memory storage. (The transfers occurs because the precession rate of the nuclear spin depends on the population's electron spin state. In other words, the nuclear spin acquires a difference in phase (over time) depending on the electron spin state. This forms the basis of a controlled-phase gate, which is a two-qubit gate that can be used to entangle the electron and nuclear spins. Once the electron and nuclear spins are entangled, a teleportation operation can transfer the electron spin state to the nuclear spin state.) If Bob's photon was not detected, however, then Alice re-initializes the spin qubit and awaits the next successful detection. This communicate-and-reset sequence takes at least a time $\tau_{idle}$, given by the sum of the communication time $\tau_{comm}$ between Alice and Bob and the spin reset time $\tau_{reset}$.

Since the other (k−1) spin qubits at the quantum receiver are inactive, each spin qubit is "on-duty" for time $\tau_{idle}/(k-1)$. After a clock cycle of $\tau_{idle}k/(k-1)$, every spin qubit will have been reset once. The quantum transmitter generates $N_k \equiv \tau_{idle}/[(k-1)\tau_0]$ entanglement generation attempts during a single spin qubit's on-duty time, where $1/\tau_0=25$ GHz is the photonic Bell pair generation rate. Increasing the number of spin qubits k beyond $\tau_{idle}/\tau_0+1$ does not improve the rate or fidelity because each spin qubit would be on duty for at most one attempt.

Achieving a target entanglement generation fidelity involves limiting the number of attempts ($N_{max}$) before spin re-initialization due to infidelity E caused by photon loss. Therefore, for a fixed number of spins k, the on-duty spin is active for $N=\min(N_k, N_{max})$ attempts. In one clock cycle, the probability that both Alice and Bob detect an entangled photon pair in the time that a single spin qubit is on-duty is:

$$p_{success} = p_{det}^2\left(\frac{1-(1-p_{det})^{2N}}{1-(1-p_{det})^2}\right).$$

Thus, the average number of successfully detected pairs per clock cycle is $kp_{success}$.

Finally, the average entanglement generation rate is the number of successfully detected pairs per clock cycle divided by the duration of the clock cycle:

$$\bar{\Gamma} = \frac{p_{success} \cdot (k-1)}{\tau_{idle}}$$

Here, we assume the downlink channels from the satellite to the ground stations are identical for simplicity, though the quantum memories allow Alice and Bob to receive photons asynchronously.

The photon detection probabilities for total downlink atmospheric attenuations of $\alpha_{atm}$=40 dB and 50 dB are $p_{det}$≈0.2% and 0.07%, respectively, combining losses from the downlink channel (20 dB), adaptive optics (3.57 dB with a pointing angle about 13°, corresponding to an altitude of h=2×$10^3$ km for a satellite (Charlie) at low Earth orbit (LEO) altitude and a 4.2×$10^3$ km distance between Alice and Bob), mode conversion efficiency (3 dB), diamond nanophotonic cavity (2.68 dB, with cooperativity C=100), switching array (assuming a single-layer low-loss interposer of ~0.8 dB insertion loss and a MEMS-based fiber switching array), and detector (0.044 dB) and neglecting platform-dependent injection losses between free-space and on-chip coupling.

FIG. 3A compares the normalized entanglement generation rate $\bar{\Gamma}\tau_{idle}/(k-1)$ at different numbers of spin qubits k∈{$10^1$, $10^8$} (upper and lower traces, respectively). In the memory-limited regime (k=$10^1$), the normalized entanglement generation rate $\bar{\Gamma}$ scales as $\sqrt{\eta}$: the advantage of the midpoint source (Charlie). In the source-limited regime (k=$10^7$), on the other hand, the normalized entanglement generation rate scales as η.

FIG. 4B shows entanglement generation rates for ZALM (solid lines) to free-running SPDC sources with narrowband 200 MHz filters (dots) as quantum transmitters in both memory-limited and source-limited regimes. At low numbers of spin qubits k, ZALM and SPDC have comparable entanglement generation rates $\bar{\Gamma}$ since the entanglement generation rates are limited by a quickly saturated bank of spin qubit memories. However, as the number of spin qubits k increases, ZALM starts outperforming SPDC. The point of divergence depends on E and Tcomm. To maintain a small $\epsilon=10^{-3}$, Alice and Bob should re-initialize the spins qubits more frequently, reducing $N_{max}$ regardless of k. Hence, ZALM and SPDC achieve similar entanglement generation rates $\bar{\Gamma}$. Instead, if $\tau_{comm}$ is reduced, e.g., at smaller $\overline{AB}=10^2$ km, to avoid memory saturation, ZALM greatly outperforms SPDC even with small k (upper left curve). Lastly, the entanglement generation rate $\bar{\Gamma}$ plateaus as k→∞ and is solely determined by η and $\tau_0$: $\bar{\Gamma}\rightarrow\eta/(1-(1=\sqrt{\eta})^2)\cdot 2/\tau_0\cdot\log(1/(1-\sqrt{\eta}))$~4.7×$10^4$ Hz for $\alpha_{atm}$=40 dB (7.4×$10^3$ Hz $\alpha_{atm}$=50 dB) for the values considered here (black dashed lines).

Conclusion

The architecture above is a zero-added-loss multiplexed (ZALM) architecture that enables quasi-deterministic entangled photon pair sources in quantum networks. The ZALM architecture greatly increases the entanglement rate in low-transmission, memory-limited links. In the scheme disclosed here, quantum receivers perform photon-to-spin mapping and completes spin-spin entanglement between a pair of terrestrial stations. A Mach-Zehnder interferometer (MZI) tree network in each quantum receiver enables cavity-based CNOT gate between local devices, e.g., for entanglement swapping between quantum repeater nodes to scale up the quantum network.

The calculated entanglement generation rate depends on (1) the memory buffer length $k_{buffer}$ and (2) the overall low success probability of loading the photonic qubits onto the spin memories. For (1), multiple nuclear spins may be used per electron spin for $k<k_{buffer}$. For (2), $p_{det}$ encompasses both photon loss in transmission and memory interfacing. Improving the transmission optics (e.g., better adaptive optics, beam-shaping to utilize transmissivity maximizing modes etc.) can reduce photon loss in transmission. And memory interfacing can be improved by increasing the photonic Bell pair emission bandwidth and memory multiplexing. One can use higher pump powers to effectively increase the cascaded source's mean photon numbers. However, pushing for higher $N_s$ could degrade Bell pair fidelity, and would involve using better detectors with lower reset times. As for memory multiplexing, given current demonstrations of >$10^2$ diamond color centers integrated on a PIC, the achievable spin-spin entanglement generation rate is about 1 ebit/s. The heterogeneous integration can be scaled up by utilizing multiple emitters within each cavity via focused-ion beam implantation and leveraging inhomogeneous distribution to spectrally select a spin.

As an alternative to cavity reflection, BSM based on an atomic emission interfering with one of the two Bell pair photons can be used to entangle remote spins. Alternative memories may include other solid-state spins, such as defects in silicon and silicon carbide, which are themselves already feasible PIC platforms, as well as rare-earth ions and atomic vapors. All of these platforms can be used for satellite-based entanglement distribution using near-term technologies. Furthermore, the ZALM Bell pair source should prove valuable to other applications, including linear optical quantum computation, precision measurement, and all-optical quantum repeaters.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of distributing quantum entanglement to a first quantum receiver and a second quantum receiver, the method comprising:

receiving, at the first quantum receiver, a first photon in a heralded photonic Bell pair;

receiving, at the first quantum receiver, a classical heralding message encoding frequency information about the heralded photonic Bell pair;

in response to the classical heralding message, converting the first photon from a first mode to a second mode different than the first mode and selected based on a spin qubit; and directing the first photon in the second mode to the spin qubit.

2. The method of claim 1, wherein converting the first photon from the first mode to the second mode comprises:

converting the first photon from a first wavelength to a first photon at a second wavelength different than the first wavelength and resonant with the spin qubit.

3. The method of claim 2, wherein directing the first photon at the second wavelength to the spin qubit comprises:

routing the first photon at the second wavelength through a tree of Mach-Zehnder interferometers integrated with a solid-state host of the spin qubit.

4. The method of claim 1, wherein the first mode is a first temporal mode and the second mode is a second temporal mode.

5. The method of claim 1, further comprising:

generating the heralded photonic Bell pair at a satellite;

transmitting the first photon of heralded photonic Bell pair from the satellite to the first quantum receiver; and transmitting a second photon of heralded photonic Bell pair from the satellite to the second quantum receiver.

6. The method of claim 5, wherein generating the heralded photonic Bell pair comprises using a broadband spontaneous parametric down conversion source.

7. The method of claim 5, wherein generating the heralded photonic Bell pair comprises combining two unheralded photonic Bell pairs using a beam splitter and a spectrally resolved photon detector array.

8. The method of claim 1, further comprising, at the first quantum receiver:

transferring a quantum state encoded by the heralded photonic Bell pair to the spin qubit.

9. The method of claim 8, further comprising, at the first quantum receiver:

determining, by the first quantum receiver, if the second quantum receiver received a second photon of the heralded photonic Bell pair; and in response to determining that the second quantum receiver received the second photon of the heralded photonic Bell pair, transferring the quantum state from an electron spin of the spin qubit to a nuclear spin.

10. The method of claim 1, wherein the heralded photonic Bell pair is a first heralded photonic Bell pair, and further comprising, after receiving the first heralded photonic Bell pair:

attempting, at the first quantum receiver, to detect a first photon in a second heralded photonic Bell pair without re-initializing the spin qubit.

11. The method of claim 1, wherein the heralded photonic Bell pair comprises a second photon at a different wavelength than the first photon.

12. The method of claim 1, wherein converting the first photon from the first mode to the second mode comprises:

performing frequency and bandwidth conversion for an efficient cavity-based spin-photon interaction between the first photon and the spin qubit.

13. The method of claim 1, wherein directing the first photon in the second mode to the spin qubit comprises routing the first photon to the spin qubit via an optical switching network.

14. A method of distributing quantum entanglement to a first quantum receiver and a second quantum receiver, the method comprising:

receiving, at the first quantum receiver, a first photon in a heralded photonic Bell pair;

receiving, at the first quantum receiver, a classical heralding message encoding frequency information about the heralded photonic Bell pair;

in response to the classical heralding message, converting the first photon from a first mode to a second mode different than the first mode and selected based on a spin qubit; and directing the first photon in the second mode to the spin qubit, further comprising:

generating the heralded photonic Bell pair in one of a plurality of wavelength-division multiplexed (WDM) channels;

determining a frequency of the one of the plurality of WDM channels; and encoding the frequency of the one of the plurality of WDM channels in the classical heralding message.

15. A quantum receiver comprising:

spin qubits;

a mode converter configured to convert a first photon in a heralded photonic Bell pair from a first mode to a second mode different than the first mode and selected based on one of the spin qubits in response to a classical heralding message accompanying the first photon in the heralded photonic Bell pair; and a switch, in optical communication with the spin qubits and the mode converter, to route the first photon from the mode converter to the one of the spin qubits.

16. The quantum receiver of claim 15, wherein the spin qubits, the mode converter, and the switch are integrated in a photonic integrated circuit.

17. The quantum receiver of claim 15, wherein the spin qubits comprise negatively charged silicon vacancies in diamond.

18. The quantum receiver of claim 15, wherein the mode converter is configured to convert the first photon from a first wavelength to a second wavelength different than the first wavelength and resonant with the one of the spin qubits.

19. The quantum receiver of claim 15, wherein the mode converter comprises an array of ring resonators comprising $\chi^{(2)}$ nonlinear material.

20. The quantum receiver of claim 19, wherein each ring resonator in the array of ring resonators is resonant at a different wavelength.

21. A system for distributing quantum entanglement, the system comprising:

a first quantum receiver according to claim 15;

a second quantum receiver according to claim 15; and a quantum transmitter, in optical communication with the first quantum receiver and the second quantum receiver, to generate the heralded photonic Bell pair and a classical heralding message and to transmit a first photon in the heralded photonic Bell pair and the classical heralding message to the first quantum receiver and a second photon in the heralded photonic Bell pair and the classical heralding message to the second quantum receiver.

22. The system of claim 21, wherein the quantum transmitter is at a satellite, the first quantum receiver is at a first ground station, and the second quantum receiver is at a second ground station.

23. The system of claim 21, wherein the quantum transmitter comprises:

a first spontaneous parametric down conversion (SPDC) source to generate a first signal photon and a first idler photon;

a second SPDC source to generate a second signal photon and a second idler photon; and a Bell state analyzer, in optical communication with the first SPDC source and the second SPDC source, to perform a Bell state measurement on the first idler photon and the second idler photon and to generate the classical heralding message based on the Bell state measurement.

* * * * *